United States Patent [19]
Cheatham et al.

[11] Patent Number: 5,456,569
[45] Date of Patent: Oct. 10, 1995

[54] BALANCED HORIZONTAL AXIS ASSEMBLY FOR USE IN AN AUTOMATED MEMORY CARTRIDGE SYSTEM

[75] Inventors: Samuel D. Cheatham, Golden; Jorgen Frandsen, Louisville; Daniel J. Plutt, Boulder, all of Colo.

[73] Assignee: Storage Technology Corporation, Louisville, Colo.

[21] Appl. No.: 153,547

[22] Filed: Nov. 16, 1993

Related U.S. Application Data

[63] Continuation of Ser. No. 53,848, Apr. 27, 1993, abandoned, which is a continuation of Ser. No. 823,731, Jan. 22, 1992, abandoned.

[51] Int. Cl.$^6$ .................................................. B66C 23/00
[52] U.S. Cl. ......................... 414/744.3; 901/17; 901/14
[58] Field of Search ........................... 414/744.3, 744.2; 901/8, 16, 17, 18, 14

[56] References Cited

U.S. PATENT DOCUMENTS

| | | | |
|---|---|---|---|
| 3,938,190 | 2/1976 | Semmlow et al. | 360/72 |
| 4,423,998 | 1/1984 | Inaba et al. | 414/744.3 X |
| 4,504,186 | 3/1985 | Richards | 414/744.3 |
| 4,527,262 | 7/1985 | Manto | 369/33 |
| 4,600,107 | 7/1986 | Price et al. | 211/41 |
| 4,864,438 | 9/1989 | Munro | 414/273 X |
| 4,864,511 | 9/1989 | Beavers et al. | 364/478 |
| 4,928,245 | 5/1990 | Goodknight et al. | 364/513 |
| 4,932,826 | 6/1990 | Goodknight et al. | 414/277 |
| 5,135,349 | 8/1992 | Lorenz et al. | 414/744.3 X |

FOREIGN PATENT DOCUMENTS

| | | | |
|---|---|---|---|
| 145929 | 6/1989 | Japan | 414/744.3 |
| 607767 | 5/1978 | U.S.S.R. | 414/744.3 |

*Primary Examiner*—Donald W. Underwood
*Attorney, Agent, or Firm*—Pennie & Edmonds

[57] ABSTRACT

For primary use in a storage and retrieval subsystem in a data processing system, a robotic transfer system acts to transfer selected electronic magnetic storage cartridges between their storage and transducing positions, typically between vertically stacked concentric tape storage holders and a selected tape drive. The robotic transfer system for handling tape cartridges includes two hands, each mounted on a separate vertical axis disposed at opposite ends of a balanced rotating horizontal axis, such that no tape cartridge is ever more than 90° away from the nearest hand. The use of two hands also provides a redundant data retrieval capability without concentrating the weight of two hands at a single end of a revolving horizontal arm, thus reducing the moments generated by angular movement and providing for faster tape access time and greater long-term system reliability.

3 Claims, 4 Drawing Sheets

BALANCED HORIZONTAL AXIS ASSEMBLY FOR USE IN AN AUTOMATED MEMORY CARTRIDGE SYSTEM

This is a continuation of application Ser. No. 08/053,848, filed Apr. 27, 1993, now abandoned which itself was a continuation of a pending prior application Ser. No. 07/823,731, filed on Jan. 22, 1992, now abandoned.

BACKGROUND OF THE INVENTION

This invention relates generally to electronic media storage and retrieval, and more particularly, to an improved method and apparatus for storing and retrieving large amounts of data contained within magnetic tape cartridges.

The use of standardized magnetic tape reels has been supplanted by small, rectangular cartridges such as those used in the IBM 3480 tape subsystem. An example of an automated memory cartridge system for handling tapes such as the IBM 3480 is taught by Moy et al. in U.S. Pat. Nos. 4,928,245, 4,932,826 and 4,864,511, all assigned to the Storage Technology Corporation. The four-by-five inch cartridge used in the IBM 3480 tape subsystem is about one-fourth the size of a standard 10.5-inch reel of magnetic tape, yet it stores up to 20% more data, or a total of 200 million characters. Thus, memory systems that use the IBM 3480 tape subsystem can be relatively efficient with respect to space requirements.

Advances provided by the digital servo control and head technology of such tape subsystems permit low acceleration tape motion, thereby eliminating the need for vacuum columns and capstans. Tape cartridges can also improve data reliability through reduction of both contaminant and handling damage. However, the advantages gained can be nearly offset by the disadvantages accruing from the use of book shelf type storage racks, such as those described in U.S. Pat. No. 4,600,107, and the difficulties which arise in selecting and handling the cartridges.

Book shelf storage racks are used to permit the selection of multiple tapes that can be read. Hence, data from multiple cartridges is randomly accessible and available on-line. In the prior art, the storage and retrieval of such cartridges was for the most part carried out by human operators. Such human intervention not only decreased the reliability of tape selection and replacement, but also prolonged the time from which a data request is made and that data is read by loading a specific cartridge into an available tape drive. While recent improvements to systems utilizing tape cartridges that incorporate magazine type automatic loaders have reduced the time that jobs wait for cartridges to be mounted and subsequently read, many such systems still require operator assistance and are inflexible as to the mounting order once installed within the magazine. It is therefore desirable to provide a randomly accessible storage and retrieval system for magnetic tape cartridges, which are capable of storing large amounts of data, while consuming as little floor space as possible, and at the same time making the data readily available as quickly as possible by minimizing human intervention.

Two prior art attempts at solving these problems are disclosed in U.S. Pat. Nos. 3,938,190 and 4,527,262, in which the systems are adapted for storing information-bearing units or modules in a polygonal configuration. For example, the storage and retrieval system for magnetic tape cassettes described in U.S. Pat. No. 3,938,190 includes a fixed two-dimensional storage array, a fixed processing or play station for extracting information from the units, and a movable selection mechanism having three degrees of freedom for transporting individual modules between the storage and transducing areas. Additionally, the system includes means for automatically sequencing a series of units, as well as a preprocessing station for cuing up individual units for intra-unit accessing.

The information storer and retriever shown in U.S. Pat. No. 4,527,262, on the other hand, includes a plurality of shelves disposed so as to be substantially tangent to a cylinder of reference of a given diameter defining an access corridor which is large enough to accommodate a transport apparatus in the approximate center of the corridor. The transport mechanism includes a carriage that is translatably disposed on a pair of parallel rods to effect X-axis translation of the carriage through the access corridor of the polygonal arrangement, and means for rotating the transport mechanism about the X-axis to select a particular shelf disposed within the polygonal arrangement. Once the appropriate angular position is achieved and the carriage has been translated in the appropriate distance along the X-axis, then the in and out movement or translation perpendicular to the X-axis is ready for activation by appropriate means.

Each of the aforedescribed U.S. Pat. Nos. 3,938,190 and 4,527,262 effectively stores and retrieves a plurality of information bearing media, but both are limited in the amounts of discrete media which may be contained therein. The substantially circular arrays provided increased amounts of data which may be stored per unit floor space, but neither system includes the capability for expansion of storage by interconnecting individual storage units, one with the other, to improve data handling efficiency.

U.S. Pat. Nos. 4,864,511, 4,928,245 and 4,932,826 to Moy et al., and assigned to the Storage Technology Corporation, herein incorporated by reference, disclose expandable automated cartridge memory systems whereby a rotating horizontal arm can be positioned to particular tape addresses. The rotating horizontal arm can move to the location of any stored tape. At the end of the rotating horizontal arm, two hands are mounted to a vertical axis to enable tape cartridges to be transported between storage and transducing positions. Two hands are mounted to the vertical axis in order to provide system redundancy. The vertical axis is mounted to the end of the horizontal arm in order to allow the hands to be positioned at any vertical tier of tape addresses. Performance limitations in such systems have been discovered, in the course of development of the present invention, to result from the use of an unbalanced horizontal arm assembly with a pair of hands and a single vertical axis mounted at one end of the horizontal arm.

The horizontal arm is unbalanced because two hands and a single vertical axis are mounted at one end. As a result, high magnitude moments are generated upon the floor of the robotic system by the unbalanced load rotating at relatively high velocities, and therefore, severe oscillatory motion can result. Because the storage tapes are optimally addressed as quickly as possible, high rotation rates are desirable, but oscillatory motion arising from an unbalanced horizontal arm can lead to difficulties.

Oscillatory motion can prevent the hands from quickly transferring tapes between storage and transducing positions. If the horizontal arm assembly is oscillating even slightly, then the vertical axis and hands at the end of the arm are moving with sufficient amplitude so that the hands are incapable of grabbing the tapes. As a result, the overall system response must be slowed sufficiently to enable the amplitude of the oscillatory movement to diminish before the hands attempt to grab the tapes. Otherwise, the tapes can be dropped and subsequently not loaded to the transducing unit. Dropped tapes must be attended to by human intervention, and therefore, the tape loading process slows down even more considerably.

The large moments exerted by the robotic structure causes the floor of the automated memory cartridge system to bend which can cause the entire automated cartridge system unit to shift over time. Such bending and spatial displacements ultimately affect system reliability. For example, a rotational servo controls the rotation of the horizontal arm. When oscillatory motion is present, the bearings in that servo can fail prematurely.

The use of a single unbalanced horizontal arm requires that two hands be mounted at the single end to achieve the desired system redundancy. Thus, the weight of two hands is concentrated at a single end of the revolving horizontal arm, thereby producing greater moments which increase the amplitude of the undesired forces exerted on the robot and its support structure, and further creates greater stress on the servo responsible for rotational motion.

Finally, with the single horizontal arm system, the arm could rotate up to 180° to locate any particular tape, thereby further reducing the tape access speed.

SUMMARY OF THE PRESENT INVENTION

In systems according to the preferred embodiment of the present invention, one vertical axis is mounted at each end of an extended horizontal axis. That is, horizontal arms extend out from the center axis of rotation in two directions, 180° apart, to form a single horizontal axis, to which a single vertical axis is mounted at each end. Each vertical axis has associated with it a single hand suitable for transferring tapes between storage and transducing positions. The automated memory cartridge system of the preferred embodiment can typically store, for example, about 6000 tapes arranged in vertically stacked concentric circles.

The floor of the present system is comprised of laterally tied together panels, which although rigid in a direction parallel to the ground, are susceptible to deformation away from the ground when extreme moments result from the rotating horizontal and vertical members. Thus, in order to obviate the need for extremely bulky and heavy floor mountings suitable for anchoring the automated memory cartridge system, it is desirable to minimize all moments generated when tapes are moved between storage and transducing positions. Since a maximum horizontal axis speed is always desirable in order to minimize tape access time, it is critical that any unnecessary weight be eliminated from the rotating assembly, as well as minimizing moments that cause displacement of the robotic structure. In the preferred embodiment, moments are minimized because one hand is mounted on each separate vertical axis, and are disposed at opposite ends of the rotating horizontal axis. Further, because two vertical axes are used, one mounted at each end of the horizontal axis, the horizontal axis is completely balanced and the primary moments generated that are the source of the undesired floor bending and oscillatory motion are reduced. By minimizing the moments, and therefore the oscillatory motion, system speed and reliability is greatly increased.

Another advantage provided by the preferred embodiment is that system redundancy is accomplished without being required to place the weight of two hands at a single end of a rotating horizontal arm. Additionally, two separate and independent vertical axis assemblies provide system redundancy. Thus, additional system redundancy and a balanced horizontal axis is achieved by placing two identical vertical members with associated hands at each end of a horizontal axis, with one-half of the total weight at each end.

Finally, with the preferred embodiment, a hand is never more than 90° away from a storage tape that is being sought. Thus, the system access time is increased because the horizontal axis is not forced to revolve, for example, 180° to fetch a tape.

DETAILED DESCRIPTION OF THE PREFERRED EMBODIMENT

Figure 3:
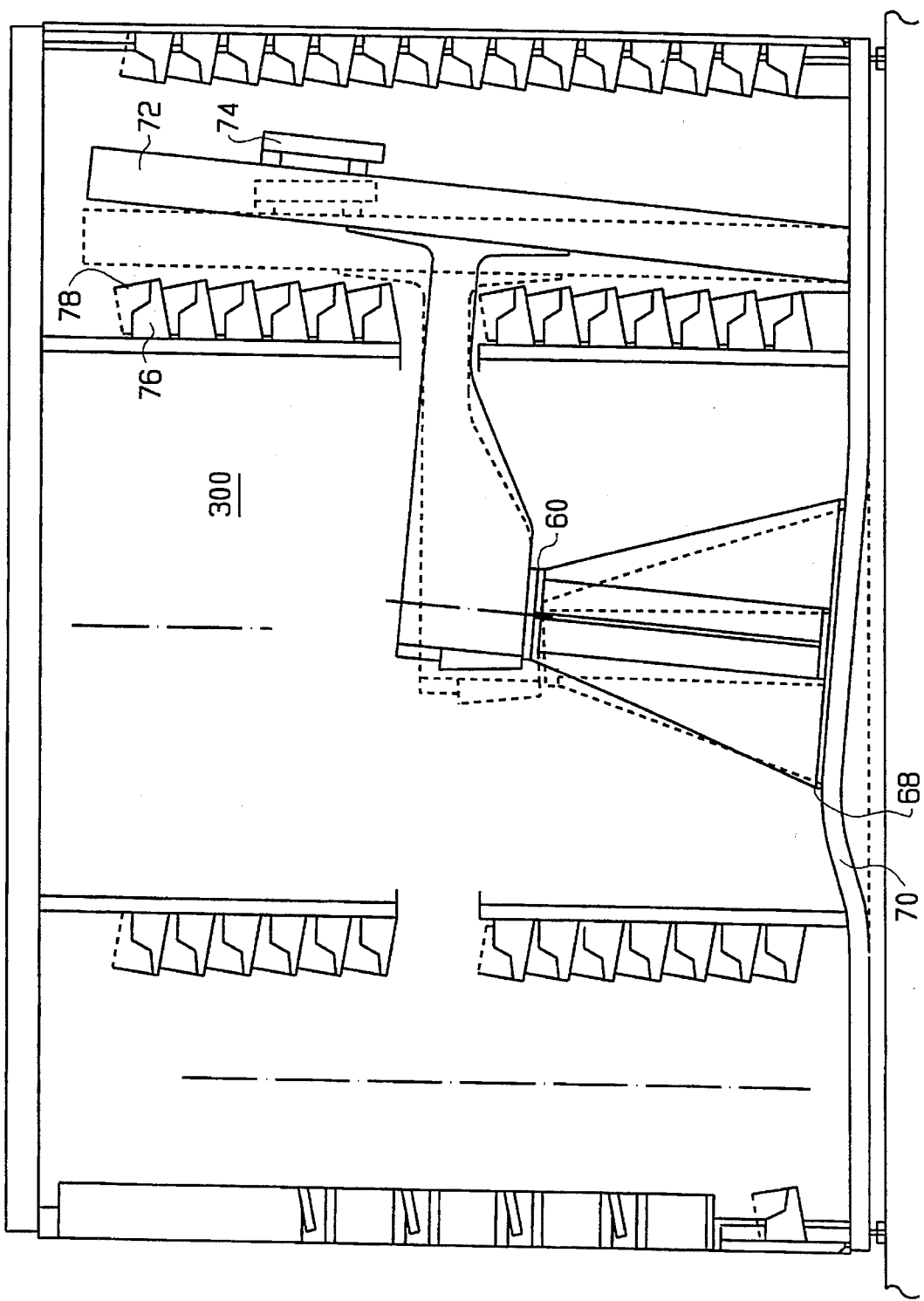
FIG. 3 is a diagram of a prior art automated memory cartridge system using an unbalanced horizontal arm assembly.

To permit a fuller appreciation of the problem addressed by the present invention, the reader is referred to FIG. 3, in which a prior art automated memory cartridge system 300 is shown. Note that when the rotational servo 60 produces angular rotation base 68 has severe moments generated upon it that translate into forces that have the effect of bending the floor 70 of the automated memory cartridge system 300. When the floor 70 is deformed, vertical axis 72 shifts. Once the vertical axis 72 shifts, the hand and camera assembly transport 74 is not able to properly grab a tape 78 stored in a cartridge holder 76. When such oscillatory motion is present, the overall system must be slowed down so that the hands 12 mounted on transport 74 will not attempt to grab a tape 78 until the oscillatory motion has sufficiently subsided. If the hand and camera assembly 12 mounted to transport 74 should attempt to grab a tape 78 stored in holder 76 before the oscillatory motion dies down, the hand 12 may drop the tape 78 onto the floor 70, thus requiring human intervention to replace the tape into holder 76. Additionally, hand 12 can impact against the tape 78 or holder 76 due to misalignment, thus causing damage.

Figure 1:
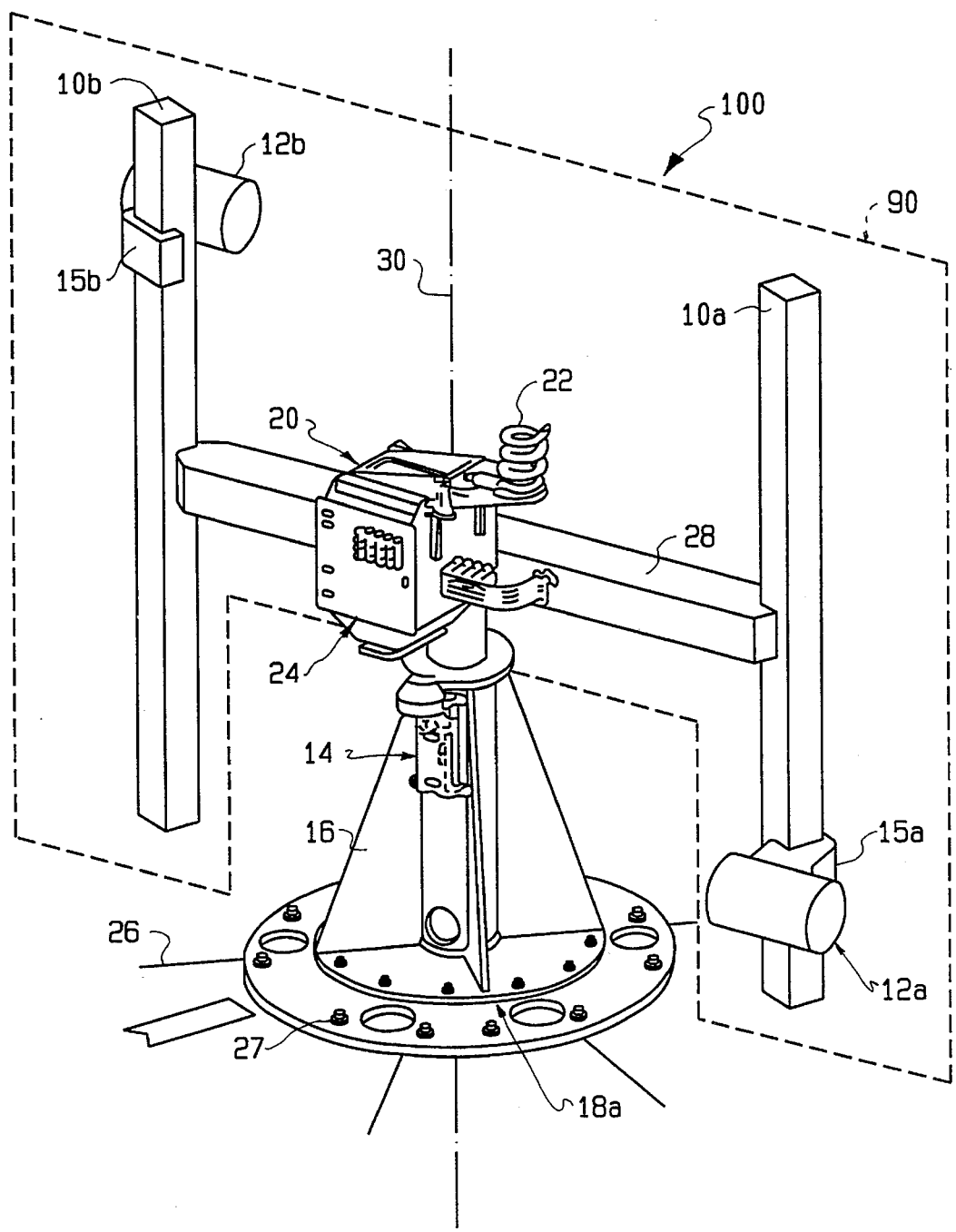
FIG. 1 is a diagram of a balanced horizontal axis assembly suitable for use in an automated memory cartridge system.

In contrast, FIG. 1 depicts an automated memory cartridge system 100 using a balanced horizontal axis assembly 90. Base 18 is fastened to the automated memory cartridge system floor 26 by way of a number of bolts 27. Ideally, it is desirable to have the base 18 and floor 26 weigh as little as possible so that users of the system 100 are able to move the system 100 as needed.

When horizontal axis 28 revolves about the center axis of rotation 30, moments are generated relative to the base 18 and ultimately upon floor 26. However, in the preferred embodiment, two vertical axes, 10a and 10b, are disposed one at each end of horizontal axis 28. In addition, each vertical axis 10 has associated with it camera and hand assemblies 12a and 12b, respectively, so that the overall weight distribution is balanced with respect to the center axis of rotation 30. The direction of the only moments generated upon the floor 26 are parallel to the direction in which the floor 26 is most rigid, unlike the moments generated in the prior art robot shown in FIG. 3.

When a host computer system determines that a particular tape must be accessed, an appropriate signal is sent to the automated memory cartridge system 100 via flexible coil 22. The information carried along flexible cable 22 is decoded by the control electronics 20, which is mounted by a card cage mount 24. The appropriate signals from a host computer direct servo motor 50 to revolve horizontal axis 28 to the appropriate position. Servo motor 50, in association with the control electronics 20, are programmed and controlled such that the shortest direction of rotational movement is selected in order to align horizontal axis 28 to select the proper tapes. The horizontal axis 28 is prevented from moving too far by horizontal axis stop assembly 14.

Figure 2:
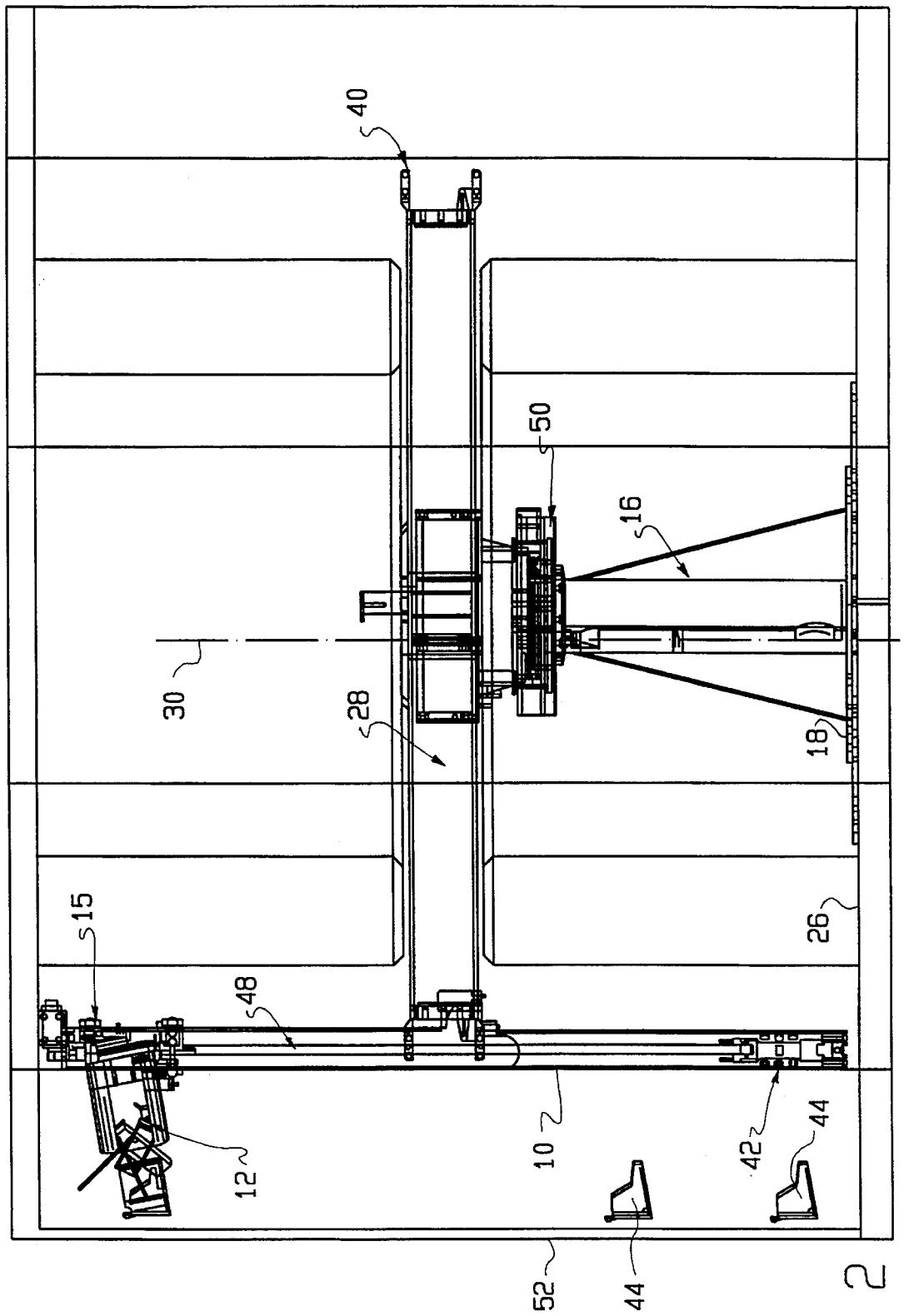
FIG. 2 is a cross-section diagram of a balanced horizontal axis assembly suitable for use in an automated memory cartridge system.

In FIG. 2, rotational servo 50 is used to generate the angular motion of horizontal axis 28 about the center axis of rotation 30. In FIG. 2, only one vertical axis 10 is shown, although a second axis would be mounted to vertical axis mounting fixture 40 in the preferred embodiment. The base 18 is connected to the rotational servo 50 by mounting hardware 16, which cooperates with the stop assembly 14. The hand and camera assemblies 12 (i.e., 12a and 12b) are mounted respectively to vertical axes 10a and 10b by transports 15a and 15b respectively. The transports 15 move vertically along the vertical axes 10 so that the two pairs of hands 12 are properly aligned in the vertical direction.

Figure 4:
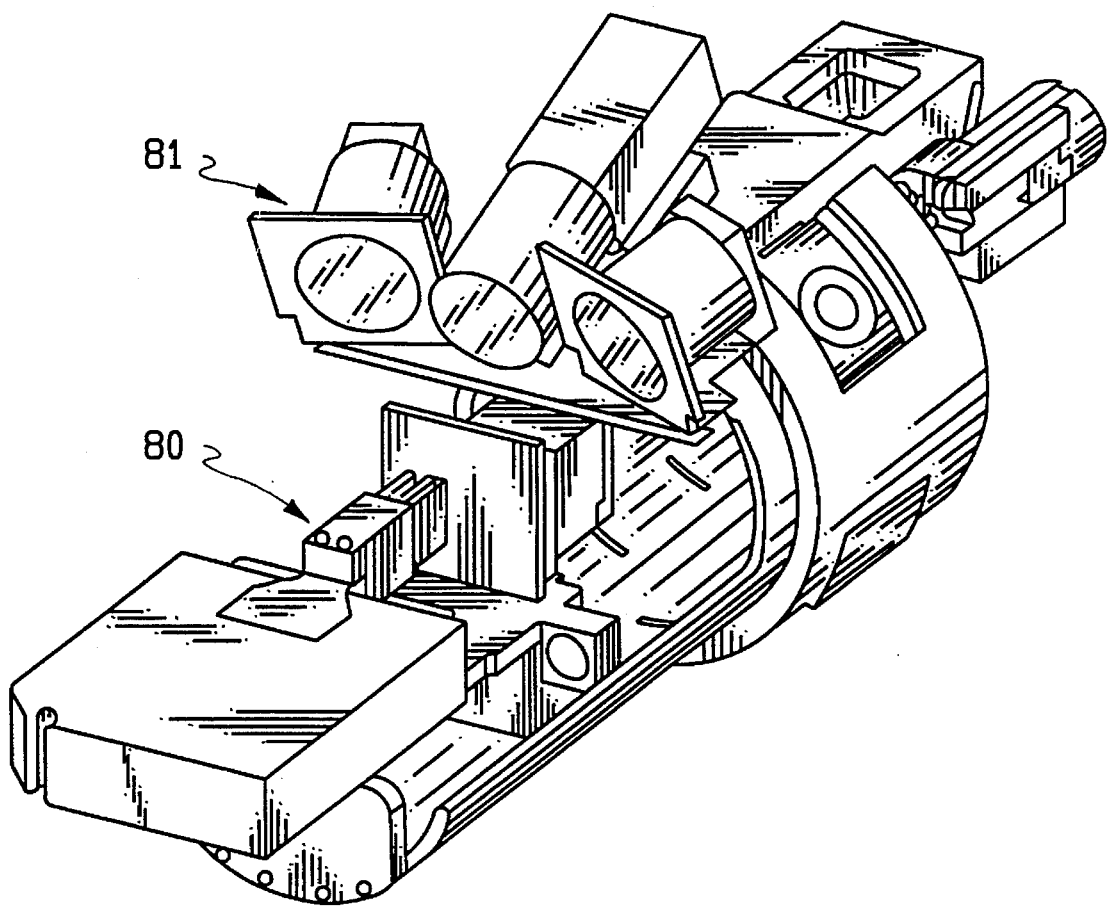
FIG. 4 is a diagram of a hand and camera assembly.

When the appropriate command is received along flexible cable 22 and decoded by control electronics 20, one of the hand and camera assemblies, 12a or 12b, is moved to a position opposite a memory cartridge holder 44. The control electronics 20 generally causes rotational servo 50 to rotate the horizontal axis 28 the shortest angular distance. In addition, control electronics 20 causes either transport 15a or 15b to vertically position hand and camera assemblies 12a or 12b directly across from the selected tape held by memory cartridge holder 44. Memory cartridge holders 44 are mounted in stacked concentric circles to the interior of the automated memory cartridge system wall 52. As illustrated in FIG. 4, hand and camera assemblies 12 each have associated with them a hand 80 for grabbing a tape from holders 44, and a camera 81 for ascertaining that the hand is precisely aligned with the particular tape stored in holder 44.

If horizontal axis 28 is not balanced, greater moments are generated upon the floor 26, which is a series of flat laterally fastened panels. When such moments are generated, large floor displacements induce oscillatory motion. Such motion continues even after the horizontal axis stops. When oscillatory motion is at a relatively high amplitude, the hand and camera assemblies 12 cannot properly align themselves across from the tapes stored at holders 44 until the oscillatory motion dies down. Balanced horizontal axis assembly 90 solves this problem, ensuring that the moments are minimized and less oscillatory motion is produced.

Other alternative embodiments with various numbers of evenly spaced balanced robotic arms can be constructed that minimize the moments generated upon the floor, enhance system reliability, and result in increased tape access speed.

Although the invention has been described and illustrated in detail, it is to be clearly understood that the same is by way of illustration and example only and is not to be taken by way of limitation. The spirit and scope of this invention is limited only by the terms of the appended claims.

We claim:

1. For use in an automated retrieval system, a balanced horizontal axis assembly, comprising:

a balanced horizontal beam having a first end and a second end;

a rotational servo connected to said beam at a central pivot point for rotating said beam about said central pivot point;

a plurality of vertical supports, one of said vertical supports attached to each of said first and second ends of said beam, such that a first portion of the vertical support resides above said beam and a second portion of said vertical support resides beneath said beam;

a plurality of gripping means for gripping data storage objects to be retrieved; and means for movably attaching at least one of said gripping means to traverse each of said vertical supports.

2. A balanced horizontal axis assembly as in claim 1, wherein each gripping means comprises:

a hand for grasping an object; and optical means for aligning the hand with the object.

3. A balanced horizontal axis assembly as in claim 1 further comprising:

means operable in response to a command to retrieve an object for controlling said rotational servo to rotate said horizontal member the shortest angular distance required to align one of said gripping means with the object.

* * * * *